United States Patent [19]
Conover

[11] 3,726,254
[45] Apr. 10, 1973

[54] METHOD OF AND HOUSING APPARATUS FOR FARROWING AND FINISHING OF FARM ANIMALS

[76] Inventor: William J. Conover, Rhodes, Iowa 50234

[22] Filed: Mar. 8, 1971

[21] Appl. No.: 121,660

[52] U.S. Cl. ......................................119/16, 119/51
[51] Int. Cl. ............................................A01k 1/00
[58] Field of Search ...................... 119/16, 18, 51, 28, 119/27, 15

[56] References Cited

UNITED STATES PATENTS

| | | | |
|---|---|---|---|
| 2,358,000 | 9/1944 | Cornell | 119/16 X |
| 3,292,584 | 12/1966 | Brodrick | 119/51 R |
| 3,225,739 | 12/1965 | Brodrick | 119/27 |
| 3,283,744 | 11/1966 | Conover | 119/16 |
| 3,463,123 | 8/1969 | Hoeltge | 119/15 |
| 3,530,831 | 9/1970 | Conover | 119/16 |

*Primary Examiner*—Aldrich F. Medbery
*Attorney*—Henderson & Strom

[57] ABSTRACT

This invention relates to a farm animal farrowing and finishing house having a plurality of floors, a portion of each floor sloping downwardly from an outer boundary toward the center of the house, a plurality of pens arranged side-by-side, a sanitation trough formed on each floor and disposed within all of the plurality of pens for receiving uneaten feed and animal excretion as waste from each of the pens, the trough sloped from one end to the other end thereof, apparatus for transmitting fluid material from the lowest end of each trough on each floor to the highest end of each trough on the next lower floor, a device for draining the fluid material from the house, and means operable to discharge fluid into a trough on an uppermost floor at the highest end thereof, and of a quantity sufficient to maintain for a predetermined period of time movement of the waste within the trough and the troughs therebelow to the draining device.

The invention also comprises a method of immunizing newborn swine against a disease commonly called the "scours" by utilizing a gravity flow of a composite of uneaten feed and excrement, combined as waste, from newborn pigs to the feeding area of pregnant sows such that the sows eat from the waste thereby ingesting the germ of the scours disease if had by the newborn pigs whereby antibodies are built up by the sows for subsequent transfer through their nursing milk to their litter of pigs, which antibodies immunize the newborn pig litters against the said disease.

10 Claims, 11 Drawing Figures

INVENTOR
WILLIAM J. CONOVER
BY
Henderson & Strom
ATTORNEYS

INVENTOR
WILLIAM J. CONOVER
BY
Henderson + Strom
ATTORNEYS

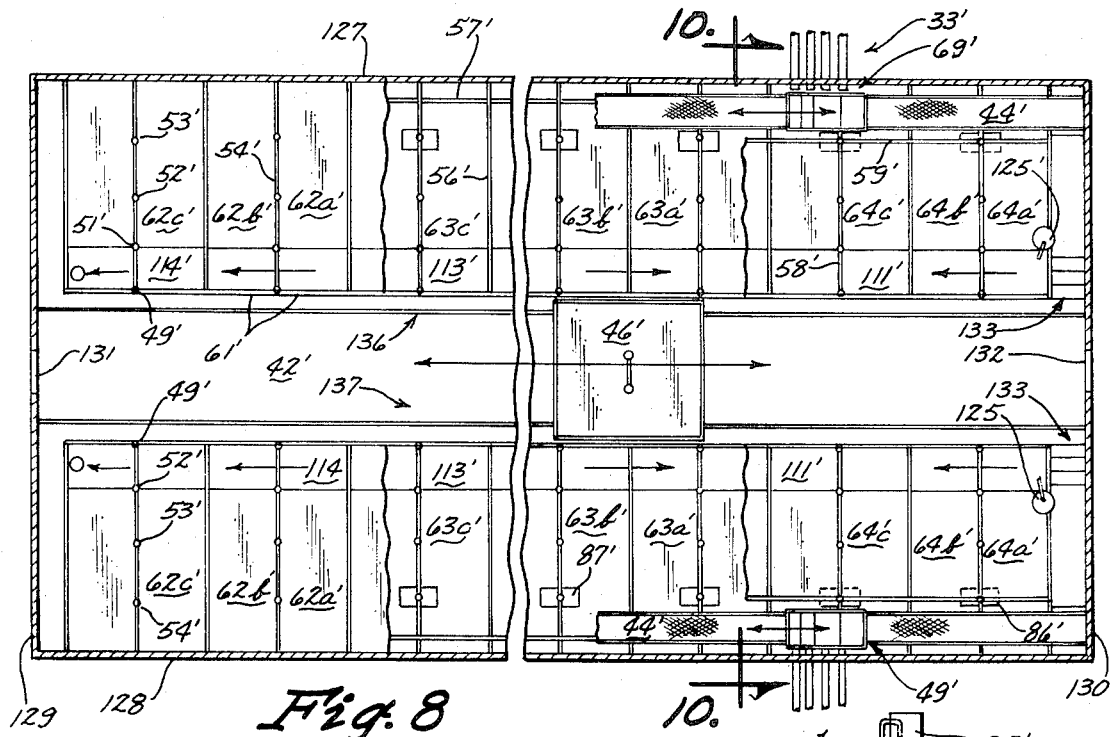
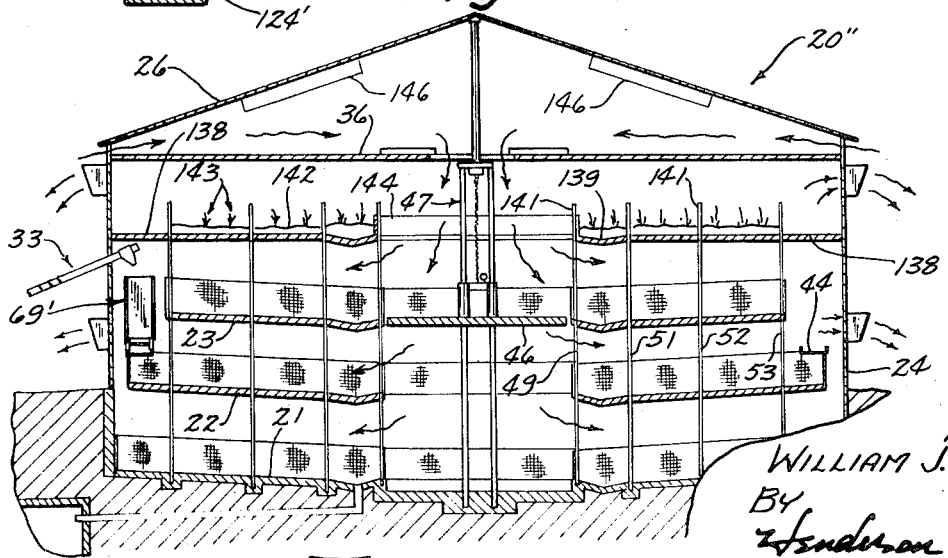

METHOD OF AND HOUSING APPARATUS FOR FARROWING AND FINISHING OF FARM ANIMALS

BACKGROUND OF THE INVENTION

This invention relates to the type of farm animal farrowing and finishing houses disclosed in U.S. Pat. Nos. 3,229,663 and 3,530,831.

Actual usage of the type of structures shown in those patents proved that although the solid floor trough for removing animal wastes was better than the grate arrangement, the overhead circularly moving trough cleansing structure, affixed to the feed auger device, causes an undue loss of feed. It was found that some uneaten feed on the sloping floors eventually ended up due to gravity in the troughs, but with the high amount of water poured onto the floors and troughs this feed was quickly flushed literally down the drain. Elimination, therefore, of this loss of feed needed to be obtained.

A further disadvantage was found in utilizing the overhead feed auger structure, particularly in view of the need of distributing various types and ratios of feed which are required in a complete farrowing and finishing house such as the instant structure.

Furthermore, after several years of research, it was found that not only solutions to these problems were had by the instant structure, but also a new method of immunizing baby pigs against a disease commonly called "scours" was discovered. This breakthrough in the prevention of this disease was of the utmost importance as attached to the present structure.

SUMMARY OF THE INVENTION

This invention relates to the utilization of every bit of feed put on the sloping floors of a farrowing and finishing house for farm animals, such as swine, which feed eventually is combined in a trough in each animal pen on a floor with excrement from the animal and wherein all troughs are connected for providing gravitational flow from the upper trough to the lower, by providing a device for periodically discharging fluid, such as water, of a sufficient amount in the upper trough to float the waste from the upper floors to the lower floor so that animals, such as sows, on the lower floors can root in and eat from the waste flow thereby ingesting not only uneaten feed, but also non-digested feed from the swine on the upper floors.

The invention relates further to the utilization of an upper floor of the house as a greenhouse for the raising of plant life.

Still further the invention relates to immunization of baby pigs against the disease commonly called "scours" by placing baby pigs on an upper floor, and pregnant sows on a lower floor, and having the excrement of the baby pigs intermingled with the noneaten feed, with the combination transmitted to the sows by the use of gravity such that the sows will eat therefrom, maintaining this arrangement for a predetermined period of time, then transferring the sows from the lower area during the nursing period.

An object of this invention is to provide an improved farm animal farrowing and finishing house.

Another object of this invention is to provide a new and novel feeding arrangement for a farm animal farrowing and finishing house for utilizing all feed initially fed to the animals, and also for utilizing all non-digested feed excreted therefrom.

Yet another object of this invention is to provide a farm animal farrowing and finishing house wherein an upper floor of the house is utilized as a greenhouse for the raising of plant life, and improving the atmosphere of both animal and plant life.

Yet another object of this invention is to provide a novel and useful method of immunizing baby pigs against a disease commonly called the "scours."

These objects and other features and advantages of this invention will become readily apparent upon reference to the following description when taken in conjunction with the accompanying drawings.

BRIEF DESCRIPTION OF THE DRAWINGS

FIG. 8 is a plan view showing the interior of a modified farrowing and finishing house embodying the same improvements;

FIG. 9 is a schematic view showing the flow of waste material over certain portions of the floors of the modified house;

FIG. 11 is a reduced elevational view showing the interior of another modified farrowing and finishing house.

DESCRIPTION OF THE PREFERRED EMBODIMENT

Figure 1:
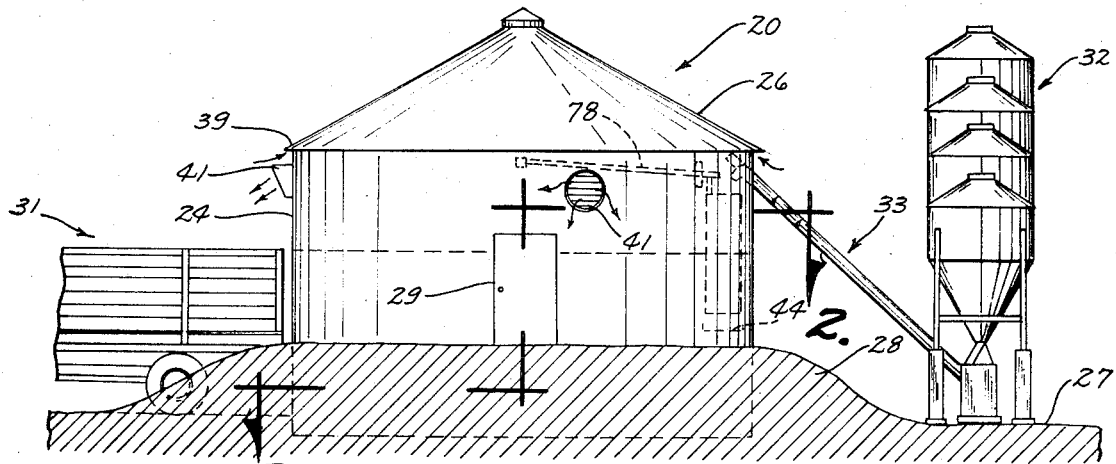
FIG. 1 is an elevational view of one embodiment of the farrowing and finishing house of this invention, the house shown in conjunction with a plurality of bulk feed tanks and a farm truck.
Figure 2:
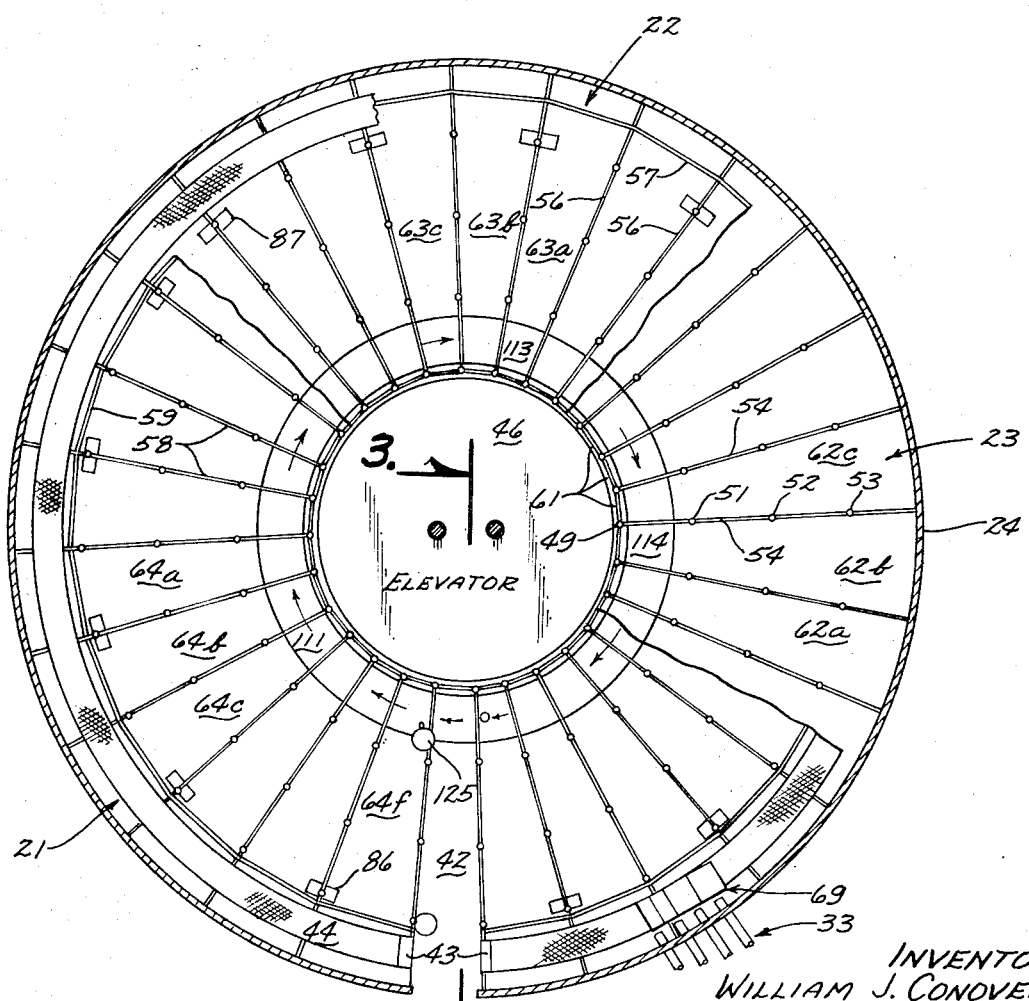
FIG. 2 is an enlarged sectional view taken along the offset line 2—2 in FIG. 1, and shows in fragmentary form the plurality of superimposed floors in plan view.

Referring to the drawings, and particularly to FIGS. 1 - 6 inclusive, an embodiment of the farm animal farrowing and finishing house of this invention is indicated generally at 20 and includes a circular first floor 21, a circular second floor 22 disposed above the first floor 21 a sufficient space such that sows on the first floor can easily manuver therebetween, and a circular third floor 23 disposed above the second floor 22 a space sufficient to enable sows and feeding pigs on the second floor to easily manuver.

An upstanding circular wall 24 of corrugated sheet steel or the like is mounted about the periphery of the first floor 21 to enclose all floors, and supports a conical roof 26 for fully enclosing the house 10. The first floor 21 is disposed horizontally at about the grade of the main ground level 27, with an earth fill 28 of approximately 3 feet being placed about the lower periphery of the wall 24 such that doors 29, only one showing, are useable by personnel and by vehicles 31 for transferring swine and other material into and out of the house 20 at the level of the second floor 22. In place of the earth fill about the entire house 10, only fills at the doors may be provided, or ramps or docks may be used.

A plurality of bulk feed tanks 32 having elevated augers 33 for discharging a predetermined number of different type feeds into the house 20 are supported adjacent thereto, with the discharge ends 34 of the augers 33 extending into the house and below a ceiling 36 provided above the third floor 23. A closeable opening 37 is provided centrally in the ceiling 36 and cooperates with openings 38 provided in the wall 24 and above the ceiling 36 but below the eave 39 of the roof 26 such that air from exterior the house 20 may enter through the wall openings 38 and the ceiling opening 37 for ventilating the interior of the house 20. Discharge of the air after use is provided by one or more ventilating fans 41 disposed about the wall 24 as illustrated.

Figure 7:
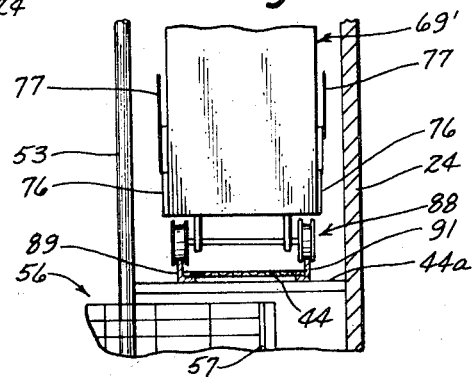
FIG. 7 is a fragmentary, somewhat enlarged view of a detail of the right side of FIG. 3, showing a modified form of feed hopper.

As mentioned hereinbefore, human access is provided through one or more doors 29 and into a passageway 42 (FIG. 2) on the second floor 22. On either side of the passageway 42, a pair of steps 43 lead to a catwalk 44 (FIGS. 2 and 3), which extends completely about the house 20 except at the passageway 42, and which is supported by arcuately spaced braces 44a (FIG. 7).

In the center of the house, the passageway 42 leads to the floor 46 of a conventional, electrically operated elevator apparatus 47, at the top of which a center post 48 is provided. The floor or platform 46 of the elevator is removable from a ground or first floor 21 position to both a second and third floor position, or any location therebetween whereby both humans and swine may readily move from the platform 46 onto any of the three floors.

A plurality of pie-shaped pens are formed in superimposed manner on the three floors by the provision of a series of radially mounted and spaced posts 49, 51, 52 and 53 (FIGS. 2 and 3), each series being arcuately spaced completely about the house 20. The posts are joined on the first floor by a fence 54, such that each pair of adjacent fences 54 form a pen. Second floor pens are formed again by a plurality of side fences 56 and end fence partitions 57 (See FIG. 2). Third floor pens are formed by a plurality of fences 58 and end fence partitions 59, the latter being mounted inside the perimeter of the catwalk 44 such that human and other movement about the catwalk is readily possible. All pens are completed by a gate 61 (FIG. 4) being swingably mounted at the inner or interior end of each pen. Thus, a plurality of pens 62a, 62b, 62c, etc. are formed on the second floor 22; and a plurality of pens 64a, 64b, 64c, etc. are formed on the third floor 23.

Figure 3:
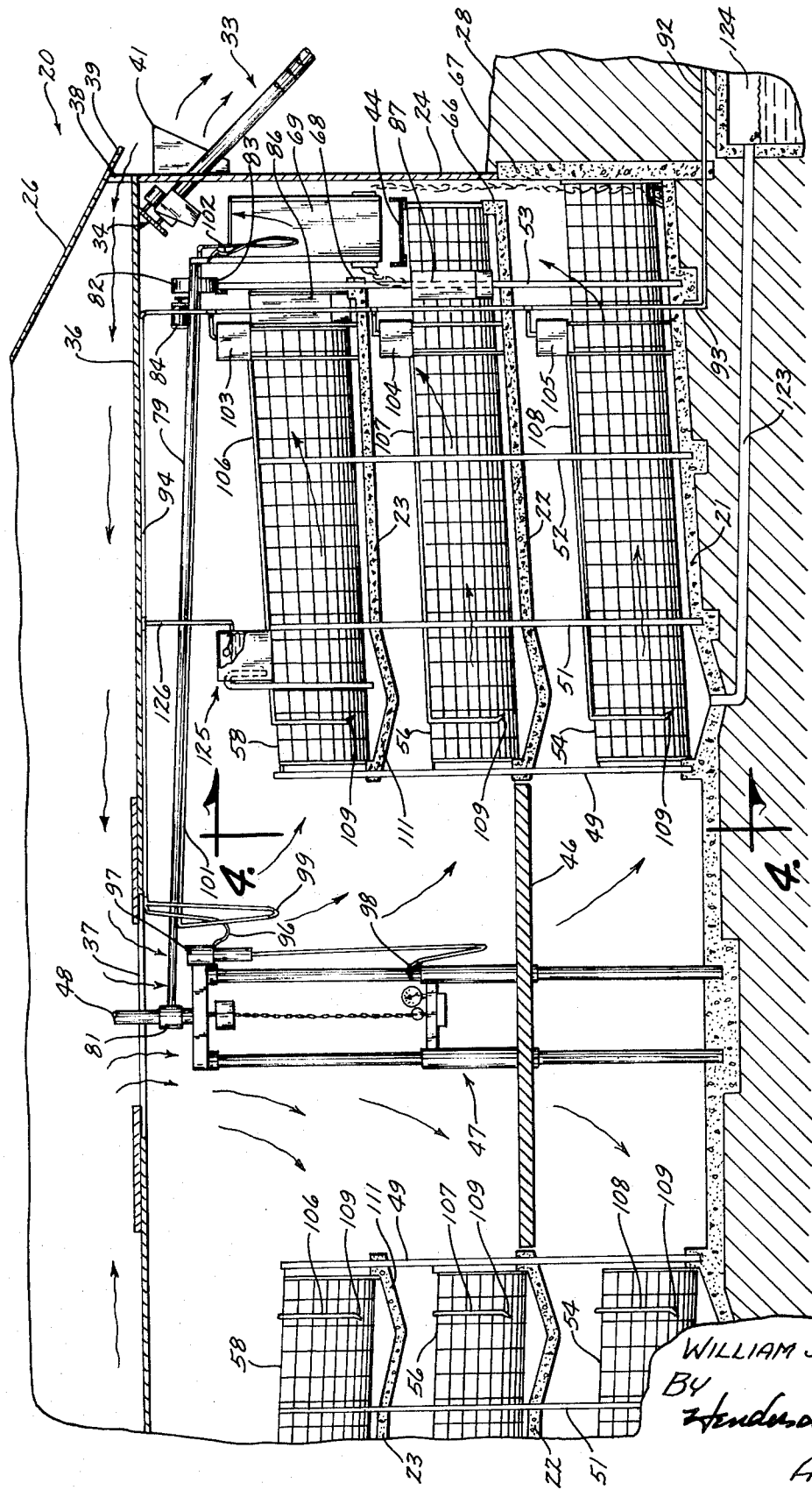
FIG. 3 is an enlarged, fragmentary, vertical sectional view taken along the offset line 3—3 in FIG. 2.

Referring to FIG. 3, it will be noted that the outer perimeter 66 of the second floor 22 is spaced slightly in from the wall 24, and from a foundation wall 67, the purpose of which is described hereinafter. Additionally, the perimeter 68 of the third floor (FIG. 3) is formed just inside the inner edge of the catwalk 44 for the purpose described hereinbefore.

As was mentioned hereinbefore, feed is supplied to the interior of the house 20 by means of the feed augers 33, the discharge ends 34 showing in FIG. 3. Adapted to be disposed directly below the discharge ends 34 is a feed hopper 69 best illustrated in FIGS. 3 and 6. The hopper includes a plurality of compartments 71, 72, 73 and 74 within which various types of ground feed, special feed, pelleted feed, and the like can be dumped from the bulk feed tank discharge ends 34.

Each compartment of the hopper 69 is provided with a sliding door 76 arrangement, manipulated by a linkage device 77 by the operator of the feed hopper 69. The hopper 69 is suspended from a frame 78 which is secured to the outer end of an extended boom 49 (FIG. 3) the inner end of which is rotatably mounted by means of a sleeve 81 on the center post 48. The feed hopper 69 is thus movable about the house 20 and above the catwalk 44, over which it is suspended, by means of a pair of arcuately spaced wheels 82 (FIG. 6) rotatably mounted on a rail 83 extended circularly about the house 20 and upon the upper ends of the outer posts 53. A motor 84 can be provided for rotating one of the wheels 82 whereby the feed hopper 69 can be moved in that manner. As an alternate arrangement, the electric motor 84 can be eliminated and the hopper 69 moved manually.

On the third floor 23, a self feeder 86 (FIG. 3) is mounted at the outer end of each fence 58 such that a lower opening of the self feeder 86 is disposed in each pen on either side of the fence section. By this arrangement, all upper floor pens are provided with self feeders from which the animals eat. Feed may also be thrown on the floor by hand if desired. The same arrangement is had on the second floor wherein another self feeder 87 (FIG. 2) is mounted adjacent the outer ends of the pens and on either sides of alternate fence sections 56. Feed is delivered from the feed hopper 69 to the third floor self feeders 86 by hand. As best shown in FIG. 3, feed is automatically delivered through one or more of the feed hopper doors 76 into the second floor self feeders 87, and from the one or more doors 76 on the outer side of the feed hopper 69, feed is dumped adjacent the wall 24, falling between it and the second floor perimeter 66 (FIG. 3) onto the first floor 21 adjacent the foundation wall 67. The wall 67 may be only an extension of the steel wall 24, which may have a cement lining.

A modified embodiment of the feed hopper 69 is shown in FIG. 7 wherein, with the overhead boom 79 and sleeve 81 removed, the hopper 69' rests upon a pair of fore and aft wheel and axle assemblies 88, with the wheels riding on a pair of rails 89 and 91 affixed to the catwalk 44.

Water for both feed and cleansing purposes is provided by a supply line 92 (FIG. 3) from exterior of the house 20, the water moving from the line 92 vertically upwardly via a conduit 93 and thence horizontally via a conduit 94 to the center of the house. A flexible conduit 96 transmits the water to a high pressure pump 97 from whence a hand operated nozzle 98 is provided for the operator on the platform 46 for directing the water under high pressure into the pens on each of the three floors, respectively, for cleansing purposes. Water is also taken from the conduit 94 by means of an auxiliary line 99 and another conduit 101 affixed to the boom 79 for providing water at another hand operated nozzle 102, thereby enabling the operator on the catwalk 44 to discharge cleansing fluid into the pens and the outer ends thereof.

Water is taken from the vertical conduit 93 into holding tanks 103, 104, and 105 on all of the three floors, from whence a plurality of conduits 106, 107, and 108 lead to an automatic watering device 109 disposed at the inner end of each pen and above a trough thereat for use by the swine as desired. Watering devices such as those illustrated at 109 are conventional in this field. They emit water only upon demand and by manipulation by the swine. It has been found that swine tend to defecate while drinking, and thus the watering devices 109 are mounted at the lower end of each pen.

To dispose of animal excrement and non-eaten feed which tumbles down from each pen on each floor due to gravity and movement of animals thereon, a trough is provided at the inner end of each pen on each floor. The third floor trough 111 (FIG. 4) begins at one side of the passageway 42 at the inner end of pen 64f (FIG. 5), and extends from this upper end 111a completely about the floor, dropping at approximately a 2 percent grade to its other lower end 112 on the opposite side of the passageway 42. In the present embodiment, with the house 20 being approximately 51 feet in diameter, the trough 111, having a shallow curved floor surface in cross section as best illustrated in FIG. 3, has approximately a four foot width and a five inch depth at its longitudinal center. Its length is approximately 52 feet.

The troughs 113 and 114 on the second end first floors, respectively, are identical to the third floor trough 111, with the exception that they extend almost a complete circle, or approximately 55 feet. The higher ends 116 and 117 (FIGS. 4 and 5) of the second and first floors, respectively, begin almost directly below the lower end 112 of the third floor trough 111, and the lower ends 118 and 119 of the second and first floors, respectively, abut their higher ends 116 and 117.

Fluid waste material from the third floor trough lower end 112 (FIG. 5) is transmitted to the highest end 116 of the second floor trough 113 by a conduit 121 (FIG. 4), and fluid waste material from the second floor lower end 118 is transmitted by a conduit 122 to the highest end 117 of the first floor trough 114. At the lower end 119 of the first floor trough 114, a drain line 123 (FIG. 3) leads beneath the floor to a septic tank 124 or lagoon for disposal of the fluid waste material external the house 20.

Figure 4:
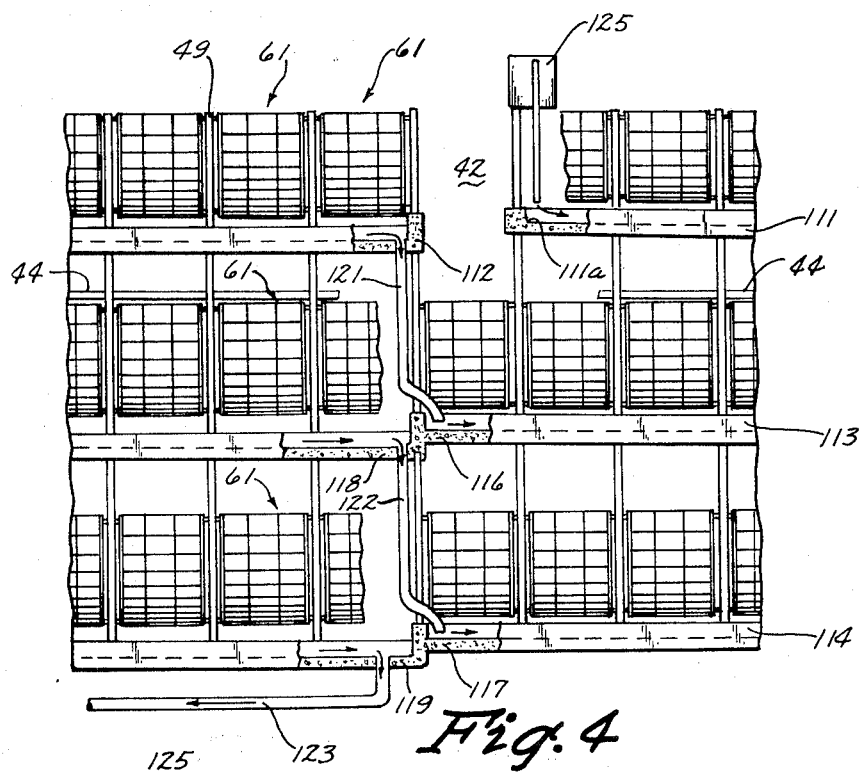
FIG. 4 is a fragmentary vertical sectional view taken along the line 4—4 in FIG. 3.
Figure 5:
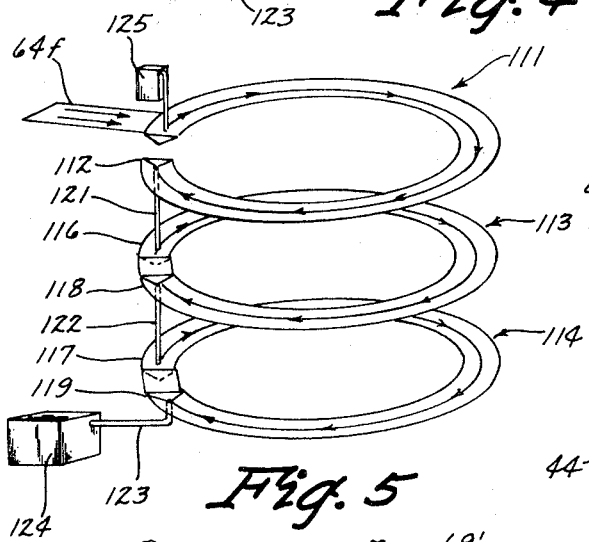
FIG. 5 is a schematic view showing the flow of waste material over certain portions of the floors of the house.
Figure 6:
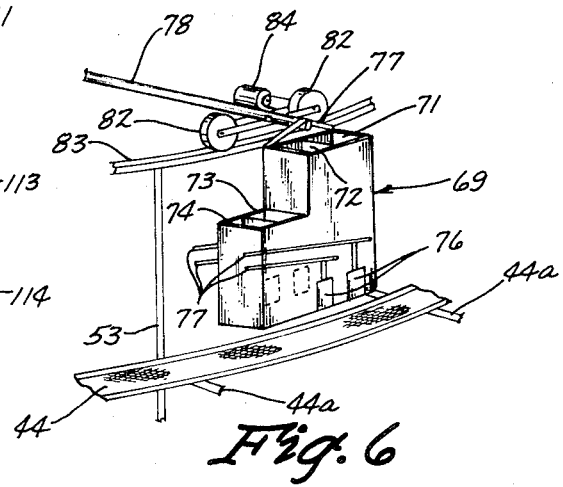
FIG. 6 is a fragmentary detail view in perspective of the feed hopper of the house.

To aid in moving the animal excrement and non-eaten feed by the primary use of gravity, one arrangement includes a conventional, float-operated watering device 125 (FIG. 3), fluid connected by a conduit 126 to the conduit 94, which will automatically discharge a predetermined amount of water at timed intervals into the third floor trough upper end 111a (FIG. 4). The recommended rate for the embodiment described herein is from ½ to 5 gallons of water per minute for 20 minutes every 6 hours. By this arrangement, sufficient flotation of the waste is obtained while rendering the rate of flow slow enough to enable the sows on the first floor to eat from the waste. This reduces the amount of protein feed normally given the sows by approximately 66 ⅔ percent, reduced the amount of carbohydrate feed to zero, and also reduces the amount of corn, milo and barley type feed to almost zero.

Another arrangement includes the provision of any kind of watering device which will discharge water into the third floor trough upper end 111a (FIG. 4) at a rate of ½ to 2 ½ gallons per minute continuously during the daylight hours from the first chore period in the morning until the last chore period in the evening.

Still another arrangement provides for discharging water, again during the aforementioned daylight period of time, into the third floor trough upper end 111a at a rate of 2 gallons per minute, accomplishing this two or three times at spaced intervals for approximately 20 minutes each time.

Figure 10:
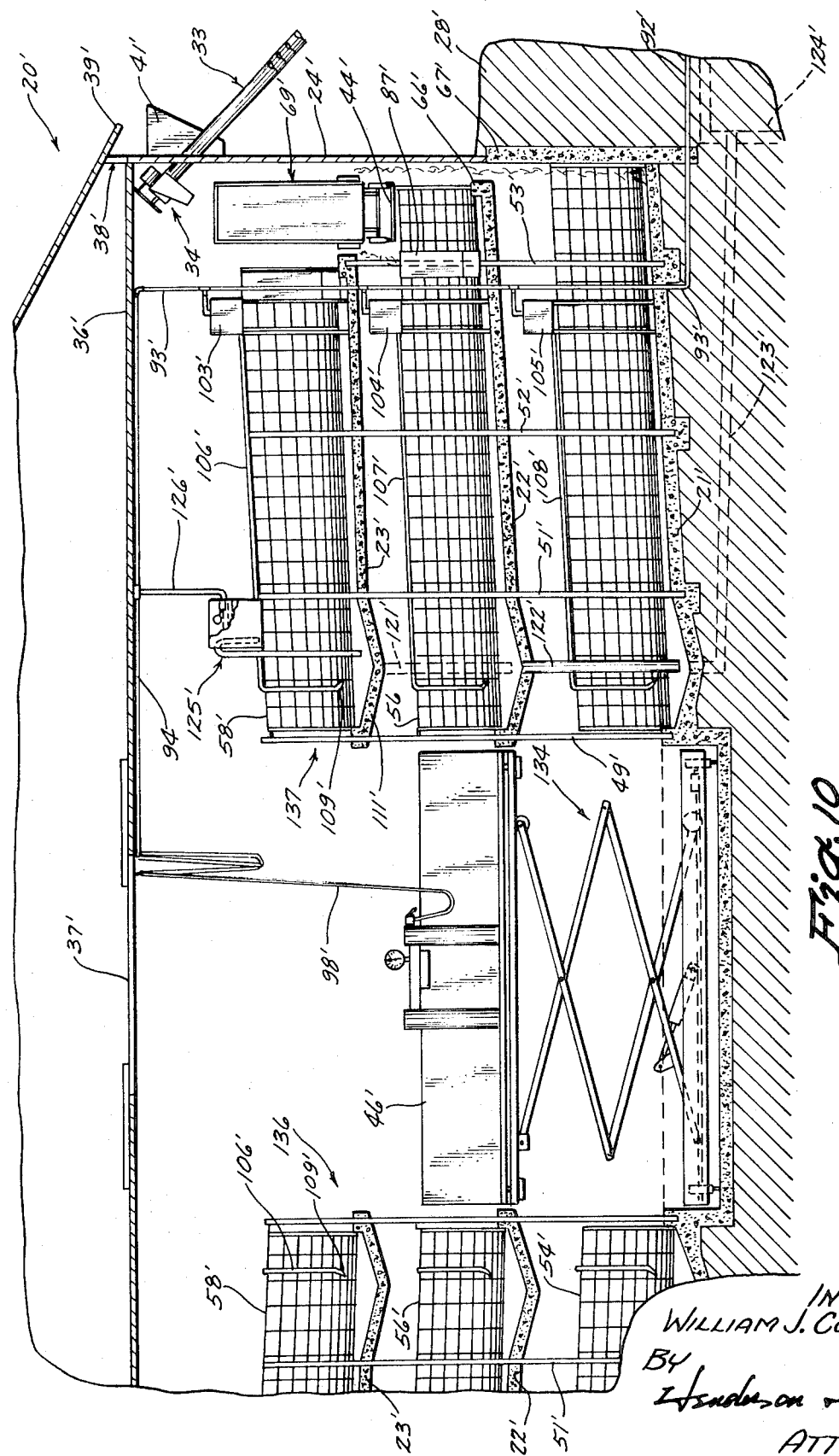
FIG. 10 is an enlarged, fragmentary vertical sectional view taken along the line 10—10 in FIG. 8.

Referring to FIGS. 8 through 10, a rectangular farrowing and finishing house 20' is illustrated which embodies the same improvements and advantages of the embodiment of FIGS. 1 – 6. All like elements are indicated by the same reference numeral and a prime.

The house 20' has side walls 127 and 128, with the end walls 129 and 130, doors 131 and 132 being provided in the end walls. Stairsteps 133 are provided at at least one end of the building 20' for access to and from the catwalks 44' on each side of the building. The passageway 42 of the first embodiment extends the entire length of the house 20' and the elevator platform 46 extends completely between the floors but extends longitudinally but a short distance as illustrated. A scissors type apparatus 134 (FIG. 10) is provided for raising and lowering the platform 46', and of course other arrangements for moving the platform 46' are readily envisioned.

Referring to FIG. 9, again water from the device 125' flows into the highest end 111a' of the trough 111' on the third floor 23' on one side 136 of the passageway 42', with the water moving the excrement and non-eaten feed down the trough to the lower end 112 thereof, from whence a conduit 121' transfers the waste to the higher end 116' of the second floor trough 113'. The waste then flows exactly like the arrangement of the FIG. 1 – 6 embodiment to the first floor lower end 119' for discharge through the drain 123'. The same flow of waste occurs on the opposite side 137 of the house 20'.

Referring to FIG. 11, a third house 20" is disclosed which is substantially identical to the farrowing and finishing house 20 of the FIG. 1 – 6 embodiment, with the exception that a fourth upper floor 138 has been added. A trough 139 is provided on the fourth floor 138, which trough 139 is substantially identical to the lower troughs 111, 113, and 114. Means is provided for transferring excess moisture from the trough 139 to the third floor trough 111 as described hereinbefore for the removal of waste material. It will be noted that the upper ends 131 of the fence posts 49, 51, 52 and 53 are exposed for any desired use. To enable soil 142 to be placed on the floor 138, such that plants 143 can be grown therein, a low solid partition 144 can be placed about the first row of posts 49 so as to prevent the soil from washing out into the center area. If proper drainage of excess water is not provided, a common drain tile (not shown) can be laid about the trough 139 in the gutter area to aid the drainage.

It can readily be seen that the ammonia and carbon dioxide created by the swine on the lower floors can be utilized in the growth of plant life on the upper, fourth floor 138. Furthermore, the production of oxygen by the plant life will therefore aid in the climatic control of the enclosed structure to the benefit of the animals therein. To provide a source of energy for the plant life, fluorescent lights 146 or the like can be mounted beneath the roof 26.

To immunize newborn swine against the "scours" disease, the following steps should be taken. Using the FIG. 1 – 6 embodiment as an example, place all pregnant sows in the pens on the first floor 21. They should be kept there at least 30 days prior to deliver. All newborn pigs should be placed on the third floor 23, and fed normal rations. Permit feed which is uneaten by the newborn pigs to intermingle with their excretion, further allowing the uneaten feed and excretion to the baby pigs to reach the third floor trough 111 by normal means. Due to the inward and downward slope of the third floor 23, the combination of gravity and movement of the swine eventually results in these wastes gathering in the trough 111.

By supplying water from the device 125, or 125', in the amount and at the rate specified hereinbefore, the combined non-eaten feed and excrement is moved from the third floor 111 to the second floor 113, and then to the first floor trough 114. This provides for a sufficiently slow rate of movement of the waste in the first floor trough 114 such that the sows on the first floor 21 can root in and eat from the waste material.

If any of the newborn pigs have the scours disease, the germ thereof will be ingested by the sows, whereby antibodies are built up by the sows for subsequent transfer through their nursing milk to their own litter of pigs, which antibodies immunize their newborn pigs against this disease. This same procedure would also be followed in using either of the other two embodiments of FIGS. 8 – 10, and FIG. 11.

The aforementioned embodiments have been and are being actually constructed. Tests as to the FIG. 1 – 6 embodiment show that by using the method and structure for moving the excrement and non-eaten feed, upon keeping from 50–100 sows on the lower floor during gestation, the annual yearly consumption of each sow is reduced by approximately 1,000 pounds as compared to the conventional feeding arrangements for sows during the same period. This reduces the amount of feed necessary to produce one pound of pork on the hoof from 4 to 3.7 lbs.

Of equal importance to the operator is the fact that the use of gravity, a force that is still cost free — as yet, is used to eliminate machinery and back breaking labor for cleansing the pens, and for helping to feed the animals, thereby reducing considerably these usual requirements of raising swine which are laborius, unpleasant, and until now, almost never ending.

Although a preferred embodiment and two modifications of the invention have been shown herein, other modifications and changes can be envisioned without departing from the true spirit and scope of the invention.

I claim:

1. In a farm animal farrowing and feeding house having a plurality of floors, a portion of each floor sloped downwardly from an outer boundary toward the center of the house, a plurality of stalls arranged side-by-side, means for supplying water to said stalls, a sanitation trough formed on each floor and disposed within all of said plurality of stalls, for receiving uneaten feed and animal excretion as waste from each of said plurality of stalls, said trough being inclined and sloped from one end to the other end thereof, apparatus for transmitting fluid material from the lowest end of each trough on each floor to the highest end of each trough on the next lower floor, and a device for draining the fluid material from the house, the improvement comprising:

stationary means operable to discharge fluid into a trough on an uppermost floor at the highest end of said trough, and of a quantity sufficient to maintain for a predetermined period of time movement of the waste within said trough and the troughs therebelow to the draining device.

2. In a farm animal farrowing and finishing house as described in claim 1, and wherein said fluid discharging means is automatically, periodically operated to effect a discharge of said fluid such that at periodic intervals said troughs are free of said fluid.

3. In a farm animal farrowing and finishing house as described in claim 1, and wherein said fluid discharge means includes a tank supplied by fluid from external the house, and a float mechanism operable upon the fluid reaching a certain level in the tank to effect a discharge of the fluid in the tank onto the trough upper end.

4. In a farm animal farrowing and finishing house as described in claim 1, and wherein a walkway is formed inside the house and about the outer boundary thereof, material moving apparatus transfers feed from outside the house to inside thereof, and hopper means is mounted within said house for movement about said walkway, said hopper means adapted to receive feed from said apparatus for transfer to said stalls.

5. In a farm animal farrowing and finishing house as described in claim 4, and wherein said hopper means is suspended above said walkway, being mounted for rotation about the center of the house.

6. In a farm animal farrowing and finishing house as described in claim 4, and wherein said hopper means is supported by and moves on said walkway, and is movable to a position below an exposed, inner, feed discharge end of said material moving apparatus.

7. A method of immunizing newborn swine against a disease commonly called the scours comprising the following steps:

placing one or more pregnant sows in a first confined area;

placing newborn pigs in a second confined area located higher than said first area;

feeding said pigs normal rations;

intermingling the feed uneaten by said pigs with their excretion;

transferring the excretion waste produced from the second area to the first area in condition for ingestion by said sows;

confining said sows in said first area for at least thirty days prior to delivery of their litters; and removing said sows at delivery to said second area.

8. In a method of immunizing newborn swine as set forth in claim 7, and wherein said excretion waste is transferred by gravity.

9. In a method of immunizing newborn swine as set forth in claim 7, and wherein said uneaten feed is intermingled with said excretion by gravity.

10. In a method of immunizing newborn swine as set forth in claim 7, and wherein water is used as a vehicle in moving said excretion waste, with the rate of flow through said first area sufficiently low to enable the pregnant sows to feed from said excretion waste.

* * * * *